(12) United States Patent
Penot (10) Patent No.: US 9,489,551 B2
(45) Date of Patent: Nov. 8, 2016

(54) METHOD FOR READING DATA STORED IN AN ELECTRONIC DEVICE FOR A TYRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Thierry Penot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 170 days.

(21) Appl. No.: 14/402,259

(22) PCT Filed: May 22, 2013

(86) PCT No.: PCT/FR2013/051112
§ 371 (c)(1),
(2) Date: Nov. 19, 2014

(87) PCT Pub. No.: WO2013/175122
PCT Pub. Date: Nov. 28, 2013

(65) Prior Publication Data
US 2015/0205988 A1  Jul. 23, 2015

(30) Foreign Application Priority Data
May 24, 2012  (FR) .................... 12 54804

(51) Int. Cl.
*G06K 7/10* (2006.01)
*B60C 23/04* (2006.01)
*B60C 23/00* (2006.01)

(52) U.S. Cl.
CPC .......... *G06K 7/10366* (2013.01); *B60C 23/00* (2013.01); *B60C 23/0462* (2013.01)

(58) Field of Classification Search
CPC ............... G06K 7/10366; G06K 7/10297; G06K 19/07786; G06K 19/07764; B60C 23/00; B60C 23/0493
See application file for complete search history.

(56) References Cited

U.S. PATENT DOCUMENTS

| 7,606,847 B2 * | 10/2009 | Grolmusz | ............ | G06N 99/002 708/203 |
| 2007/0135179 A1 | 6/2007 | Hardman et al. | ............. | 455/574 |
| 2013/0248600 A1 * | 9/2013 | Penot | ............... | G06K 19/07786 235/439 |

OTHER PUBLICATIONS

Automotive Industry Action Group (AIAG): "B-11 Item Level Radio Frequency Identification (RFID) Standard," version 8, pp. 1-57 (Nov. 2009), and erratum sheet dated Sep. 7, 2010.

*Primary Examiner* — Nabil Syed
(74) *Attorney, Agent, or Firm* — Fitzpatrick, Cella, Harper & Scinto (57) ABSTRACT

A method is provided for reading data relating to a tire, in which the data is stored in an electronic device integrated into the tire, and in which the tire is identified by a serial number and a manufacturing week number. A storage unit of the electronic device includes a data storage zone having a storage range formed of a number of bits. The storage range is also referred to as a restricted range, and the number of bits of the restricted range is less than or equal to 38. According to the method, the data stored in the restricted range is read, and the data read from the restricted range is decoded in order to determine the serial number and the manufacturing week number of the tire.

13 Claims, 2 Drawing Sheets

METHOD FOR READING DATA STORED IN AN ELECTRONIC DEVICE FOR A TYRE

FIELD OF THE INVENTION

The present invention relates to the field of tyres, and in particular to that of electronic devices designed to be integrated into tyres. The invention is applicable to any type of tyre, to passenger vehicles, and more particularly to tyres for industrial vehicles such as vans, heavy vehicles such as light rail vehicles, buses, heavy road transport vehicles, for example lorries, tractors and trailers, and off-road vehicles such as agricultural or civil engineering vehicles or any other transport or cargo handling vehicles.

RELATED ART

Tyres bearing a variety of data which are marked on the sidewalls of the tyres, by moulding for example, are known from the prior art. These data comprise, notably, an identifier of the tyre manufacturer and the geometrical characteristics of the tyre, for example a flange width, a load capacity index or a speed code.

These data comprise, in particular, a serial number of the tyre, also called a production number of the tyre. This serial number is a number which, in combination with the product identification code (or "CAI" code), identifies each tyre in a unique way. It takes different forms according to tyre brand, but is generally in the form of a sequence of alphanumeric values, that is to say digits and/or letters. For example, the serial number can identify a production number, a factory, and a month and year of manufacture of the tyre, and, if appropriate, a code used for the retreading of the tyre.

A code commonly called the "DOT number" or "DOT index" can also be found among the data marked on the tyre sidewall. This code is used, in particular, for tyres intended for use in North America. It is currently required by American law ("Department of Transportation") for the export of the tyre to the United States and Canada. The DOT number comprises several groups of data such as the size code of the tyre, the production factory, and the like. In particular, the fourth group of data in the DOT number generally takes the form of four digits, the first two digits indicating the week of manufacture and the next two indicating the year of manufacture of the tyre. It should be noted that some of the data appearing in the serial number or the CAI code can be used to deduce the DOT number of the tyre. However, the manufacturing week number, appearing in the fourth group of data in the DOT number, cannot be deduced from the serial number.

It has been found that markings such as the serial number or the DOT number are liable to be damaged by natural agents such as sunlight or rain. They are also subject to the normal wear of the tyre or to accelerated wear, due for example to repeated friction of the tyre sidewalls against pavements. Finally, these markings may be fraudulently altered by moulding a new layer of rubber on to the existing markings.

The loss or alteration of the markings, notably the serial number or the DOT number, is a matter for concern because this makes it impossible to identify the tyre in order to carry out regular monitoring of the tyre, for example. This problem arises, notably, in cases where numerous tyres have to be managed, for example in the case of fleets of vehicles.

BRIEF DESCRIPTION OF EMBODIMENTS OF THE INVENTION

The object of the invention is to provide reliable identification of a tyre.

To this end, the invention proposes a data reading method, the data being stored in an electronic device integrated into a tyre identified by a serial number and a manufacturing week number, the device comprising data storage means, the storage means comprising a data storage zone comprising a storage range in the form of bits, this range being called the restricted range and comprising a quantity of bits which is less than or equal to 38, in which method:
 the data stored in the restricted range are read, and
 the data that have been read are decoded in order to determine the serial number and the week number of the tyre.

Thus, by storing the data in the electronic device integrated in the tyre, the data are protected from damage by natural agents, from tyre wear, and also from fraudulent alteration. This is because the device is protected by the rubber of the tyre in which it is generally embedded. Moreover, during the manufacture of the tyre, it is no longer necessary to provide a step of moulding the data on to the sidewalls of the tyre. The method of manufacturing the tyre can thus be simplified.

It is also particularly useful to be able to store the data relating to the serial number and the DOT number in a restricted storage range having a maximum of 38 bits. This is because, with this method, these data can be stored in a standardized zone, conforming to a specific format, SGTIN 96 (Serial Global Trade Item Number, as described in EPC Tag Data Standard version 1.5 published by GS1). In this standardized zone, the first 8 bits are reserved for a protocol header ("Header"), the next 3 bits are reserved for a filter value ("Filter"), the next 3 bits are reserved for a partition value ("Partition"), the next 20 bits are reserved for an identifier of the tyre manufacturer ("Company Identification"), the next 24 bits are reserved for an item reference ("Item Reference"), and the last 38 bits are reserved for a serial number of the tyre ("Serial Number"). Thus the last-mentioned standardized 38-bit range can be used to store data from which the serial number and the DOT number can be deduced.

This method is particularly useful where the serial number is composed of 4 letters and 5 digits and the DOT number is composed of 4 digits. This is because the inventors have overcome the prejudice according to which these alphanumeric values are too numerous to be encoded in a zone restricted to 38 bits.

The method may also have one or more of the following characteristics, considered individually or in combination.

The decoding of the data read from the restricted range provides, in a first step, values that can be used to identify a production number, a factory, and a month and year of manufacture of the tyre, and, if appropriate, a code used for the retreading of the tyre, and that can be used to determine, in a second step, the serial number and part of the DOT number of the tyre. This is because, owing to the values provided, it is possible to deduce, on the one hand, the serial number, generally composed of a sequence of characters enabling the month, year, factory, production number, and retreading code to be identified. On the other hand, it is possible to determine the DOT number, generally composed of a sequence of four digits enabling the week and year of manufacture of the tyre to be identified.

The production number is identified by 5 digits.

The factory, the month and the year of manufacture are identified by a combination of 3 letters. This set of three letters provides data according to a conversion table in which, according to one embodiment, the year of manufacture may take 12 values (on a rolling basis), the month may also take 12 values, and the manufacturing factory may take 96 possible values. Thus, in the set of three letters, the first identifies the month, the second identifies the factory, and the third identifies the year of manufacture; the same second letter may, in itself, denote a plurality of different factories, but, when combined with the first and the third letter, this second letter can only denote a single factory.

The week of manufacture is identified by one digit.

The code used for retreading the tyre is identified by one letter.

The week of manufacture is identified by an integer digit from 1 to 6. Thus, instead of using a number from 1 to 53 in the conventional way (some years have 53 weeks) to identify the week of manufacture of the tyre, the inventors had the idea of reducing the quantity of possible values for identifying a week, thereby reducing the space required for storing the data, by using a digit from 1 to 6. This is because this digit, when associated with a month of manufacture identified elsewhere, provides a unique identifier of the week of the year in which manufacturing took place. In other words, for a given year and month, a maximum of 6 weeks is possible (the number 6 is reached, for example, when the first day of the month is a Sunday in a 30- or 31-day month, or when the first day of the month is a Saturday in a 31-day month).

The serial number and the week of manufacture of the tyre are determined from 10 values, namely 4 letters and 6 digits, each being obtained by decoding the data read from the restricted range. Thus, the method proposes to reconstitute the serial number and the DOT number from the 10 alphanumeric values uniquely stored in the restricted range.

The data that have been read are decoded by decomposition of the binary quantity stored in the bits of the restricted range on a base defined by a free generating family of vectors, this family being distinct from a family of polynomials, a family of polynomials being defined as a family of the type $(A^0; A^1; A^2; \ldots; A^n)$, where n is a positive integer and A is a constant real quantity. This family of polynomials may also be called a family of polynomials staged by degrees, in which family the vectors are a sequence of powers of a single quantity. Thus the base on which the decomposition is performed is distinguished from a commonly used base such as base 1 (unary system), base 2 (binary system), base 3 (trinary system), base 8 (octal system), base 10 (decimal system), base 12 (duodecimal system), base 16 (hexadecimal system), base 20 (vigesimal system), base 60 (sexagesimal system) or base 150 (the "Indian base"). In fact, the proposal is to construct a base whose vectors are adapted to the types of values to be stored, in order to make the best possible use of the available storage space. For example, one of the vectors can be 6, if it is desirable for its coefficient in the decomposition of the binary quantity to correspond to a value allowing a week to be identified within a month, whereas another vector of the same base may be $6*24^2$ (and not $6^3$ if base 6 was used), if it is desirable for its coefficient in the decomposition of the binary quantity to correspond to a value enabling a letter to be identified. In other words, the decomposed binary quantity N can take the following form: $N=\Sigma c_i X_i$, where i is an integer from 0 to n, $X_i$ is the sequence of vectors of the generating family of the base, defined in such a way that $X_i \neq A^i$ where A is constant regardless of the value of i, and, on the other hand, $c_i$ is the sequence of the coefficients of the decomposition of the binary quantity N on the base defined by the family $(X_0; X_1; \ldots; X_n)$. The decomposition on this base is unique; that is to say, for any quantity N there is a unique sequence of coefficients $c_i$ enabling it to be decomposed.

The data that have been read are decoded by decomposition of the binary quantity stored in the bits of the restricted range on a base defined by a free generating family of vectors, one or more of the decomposition coefficients in the base corresponding to a value making it possible to identify one or more members of the group comprising a production number, a factory, a week, a month, a year of manufacture of the tyre and a code used for retreading the tyre.

The dimension of the base is 6, the decomposition of the binary quantity stored in the restricted range providing six coefficients ($c_0$; $c_1$; $c_2$; $c_3$; $c_4$; $c_5$), of which:

the first ($c_0$) coefficient of the decomposition can be used to identify a manufacturing week number of the tyre, the second ($c_1$) coefficient of the decomposition can be used to identify a letter corresponding to a code used for the retreading of the tyre, the third, fourth and fifth ($c_2$; $c_3$; $c_4$) coefficients of the decomposition can be used to identify three letters which, in combination, indicate a month, a factory and a year of manufacture of the tyre, the sixth ($c_5$) coefficient of the decomposition can be used to identify a production number of the tyre.

The data that have been read are decoded by decomposition of the binary quantity stored in the restricted range on the base defined by the following free generating family: (1; $6^1$; $6*24^1$; $6*24^2$; $6*24^3$; $6*24^4$).

The storage zone comprises, in addition to the restricted range, at least one range of bits reserved for at least one element chosen from among a protocol header, a filter value, a partition value, an identifier of the tyre manufacturer, and an item reference.

The storage zone is standardized, so that the quantity of bits stored in this zone is limited by a standard, the storage means also comprising a data storage zone, called the "free zone". This free zone, which is not standardized, does not conform to any particular format. It is generally used by motor vehicle manufacturers to store data other than those relating directly to the tyre. It is therefore important for the motor vehicle manufacturer to have the whole space of this non-standardized zone available to store the maximum of data.

The invention also proposes a method for writing data to an electronic device integrated in a tyre, allowing the data to be read subsequently by using a reading method as described above, in the course of which:

the serial number and the manufacturing week number of the tyre are converted to a sequence of alphanumeric values, each value is encoded in a first step, so as to obtain a sequence of integers called coefficients ($c_0$; $c_1$; $c_2$; $c_3$; $c_4$; $c_5$), a quantity is calculated by multiplying each coefficient by a corresponding vector ($X_0$; $X_1$; $X_2$ $X_3$ $X_4$ $X_5$) of a predetermined free arithmetic base, this quantity is encoded in bits, this quantity in bits is written to the restricted range.

The invention also proposes a computer program comprising coded instructions for commanding the execution of the steps of a reading method or a writing method as described above, when it is run on a computer.

By comparison with a solution in which the data are stored in two different zones of the electronic device, the reading and writing method according to the invention has the advantage of simplifying the industrial procedure of writing data to the electronic device, since the writing times are substantially reduced and therefore have a much smaller effect on the tyre manufacturing process.

This method is also advantageous for the users of the tyres, because reading all the data in a single zone reduces the reading time and thus facilitates the management of fleets of tyres.

The invention further proposes a unit for reading data stored in bit form in an electronic device integrated into a tyre for the execution of a method as defined above, this unit comprising means for reading data stored in the electronic device and means for decoding the bits that have been read so as to provide the serial number and the manufacturing week number of the tyre.

It should also be noted that the reading and writing methods described above can be used for data located in a different storage zone from a range of less than 38 bits, and for the purpose of determining information other than a serial number and a manufacturing week number of the tyre. In fact, these methods can be used to encode or decode any type of alphanumeric data over a restricted range, in which there are limitations regarding the data storage capacity.

To this end, it is possible to propose in a more general way a method for writing data in bit form into a storage zone called the restricted zone, the data taking the form of a sequence of alphanumeric values, in which method:

each alphanumeric value is encoded in a first step, so as to obtain a sequence of integers called coefficients, a quantity, called the final quantity, is calculated by multiplying each coefficient by a corresponding vector of a predetermined base defined by a free generating family of vectors, this family being distinct from a family of polynomials, a family of polynomials being defined as a family of the type ($A^0$; $A^1$; $A^2$; . . . ; $A^n$), where n is a positive integer and A is a constant real quantity, this final quantity is encoded in bits, and this final quantity in bits is written to the restricted zone.

It is also possible to propose a method for reading data stored in a storage zone called the restricted zone, the data taking the form of bits, in which method:

a binary quantity is read from the data in bit form, a first decoding step is carried out by decomposition of the binary quantity on a base defined by a free generating family of vectors, this family being distinct from a standard base, this family being distinct from a family of polynomials, a family of polynomials being defined as a family of the type ($A^0$; $A^1$; $A^2$; . . . ; $A^n$), where n is a positive integer and A is a constant real quantity, in such a way that coefficients of decomposition of the binary quantity on the base are obtained, for at least one of the decomposition coefficients, a second step of decoding is carried out, in such a way that the set of decomposition coefficients, when juxtaposed, becomes a sequence of alphanumeric values, comprising at least one letter.

Clearly, the decomposition base is the same as that described previously in the present description.

BRIEF DESCRIPTION OF THE DRAWINGS

The invention will be more clearly understood from the following description which is provided solely by way of non-limiting example, and which refers to the drawings, in which.

DETAILED DESCRIPTION OF EMBODIMENTS OF THE INVENTION

Figure 1:
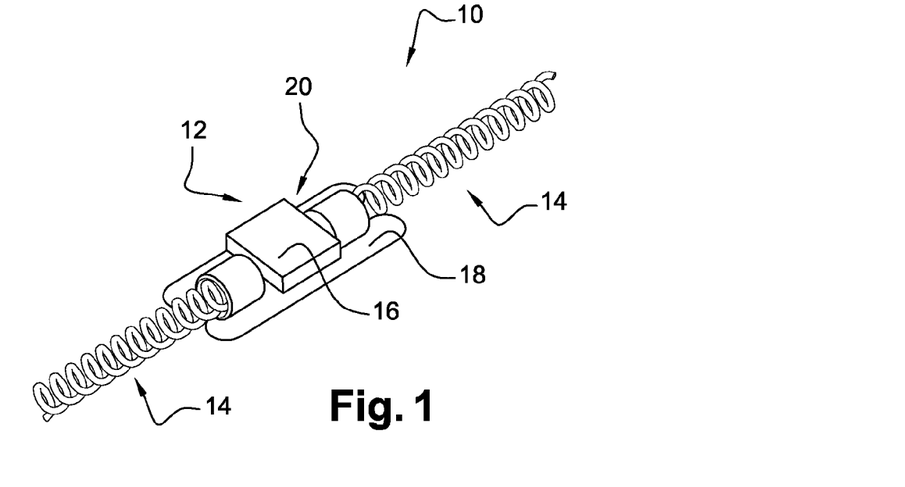
FIG. 1 shows an electronic device of a tyre.

FIG. 1 shows an electronic device according to one embodiment, indicated by the general reference 10. The device 10 comprises an electronic member 12 and two antennae 14 forming a dipole. The electronic member 12 comprises an RFID (Radio Frequency Identification) chip 16, also called an "RFID tag", fixed to a support 18. Each antenna 14 comprises a wire, of spiral shape in this case, and is associated with the chip 16 so as to allow radio communication to be established with a transceiver. The device 10 is introduced into the tyre during the manufacture of the latter.

Figure 2:
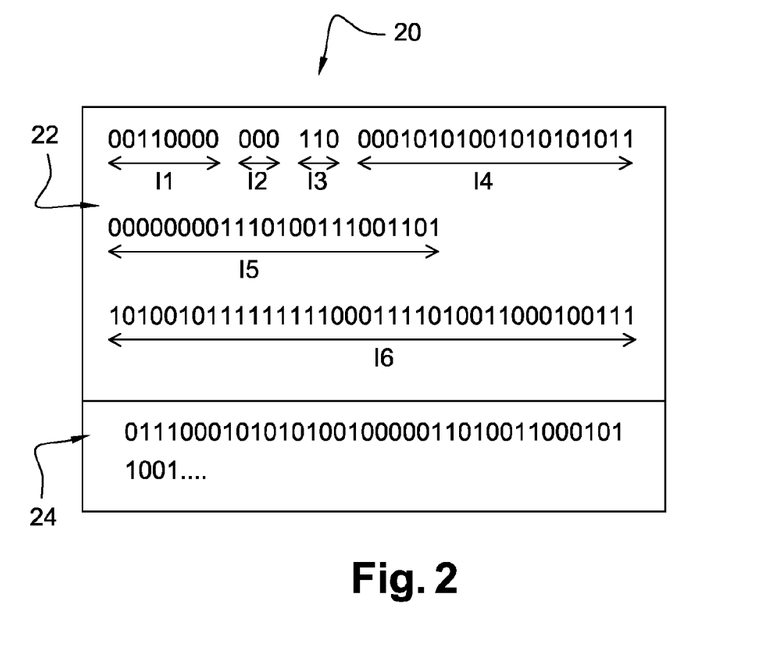
FIG. 2 is a schematic representation of data storage means of the device of FIG. 1.

The electronic member 12, or more precisely the chip 16, comprises data storage means 20, shown schematically in FIG. 2. The means 20 comprise, on the one hand, a standardized data storage zone 22, intended, notably, for the identification of the tyre on which the device 10 is fitted, and, on the other hand, a non-standardized data storage zone 24 called the "user memory" (the memory zone for the user).

The standardized zone 22 is defined by an international or national standard or specification. In this example, the zone 22 is a zone called U2, according to the specific SGTIN 96 format. Thus the data in the standardized zone 22 are stored in 96 bits. More precisely, the standardized zone 22 comprises reserved ranges I1 to I6 for data stored in bit form. Each range I1-I6 is reserved, respectively, for a protocol header called "Header", a filter value called "Filter", a partition value called "Partition", an identifier of the tyre manufacturer called "Company Identification", an item reference called "Item Reference", and a serial number called "Serial Number". Each range I1-I6 comprises, respectively, 8 bits, 3 bits, 3 bits, 20 bits, 24 bits and 38 bits.

Thus the range I6 corresponds to a range of 38 bits in which it is desired to store data for determining the serial number and the manufacturing week number of the tyre, and it therefore forms the fourth group, for the DOT number. This is made possible by a data reading or writing method described below, with reference to the following two examples, where FIG. 2 shows the storage of data relating to Example 2.

In the present application, "digit" denotes a positive integer in the range from 0 to 9, "quantity" denotes a combination of one or more digits, "alphanumeric value" denotes a digit or a letter of the alphabet, and "number"

denotes a sequence of alphanumeric values. For example, a "serial number" may take the form ZZC89536T.

Example 1

Data stored in range I6:
N=10100101111111110001111010011000100111
Serial number determined after decoding: ZZC89536T.
Part of the DOT number determined after decoding: 0911 (i.e. week 9).

Example 2

Data stored in range I6:
N=11001111101001001101110101011010111000
Serial number determined after decoding: OLY56000R.
Part of the DOT number determined after decoding: 1410 (i.e. week 14).

As shown above, the serial number according to the examples is composed of the following data:
- A combination of three letters for identifying the factory, the month and the year of manufacture, based on a conversion table which is not detailed here. Thus, in Example 1, the set of three letters ZZC signifies that the tyre was manufactured in February, in the Zuen factory, in the year 2011.
- Five digits for identifying the production number of the tyre, in the range from 1 to 99999. In Example 1, the production number is 89536.
- A letter corresponding to a code used for the retreading of the tyre, namely T in Example 1.

In these examples, each of the letters can take 24 possible values (because 2 letters of the alphabet are not used). However, each letter could take more or less than 24 values, with a maximum of 26 possible values.

On the other hand, the part of the DOT number to be determined from the data in range I6 is composed of the following data:
- Two digits to indicate the week of manufacture, namely the 9th week of the year in Example 1.
- Two digits to indicate the year of manufacture, namely 2011 in Example 1. This information relating to the year is the same as that given in the serial number.

It can be seen from the above information that, in Example 2, the set of three letters OLY signifies, according to the conversion tables, that the tyre was manufactured in April at the Aranda factory in year 2010, that the production number is 56000, that the code used for retreading is R, and that the week number is 14.

Thus, to enable a serial number and the fourth group of the DOT number to be reconstituted from the data stored in range I6, it must be possible to encode all of the following in this range: 4 letters and 7 digits (5 for the production number and 2 for the week number, the year and month being provided by the set of three letters). In the present examples, a letter of the alphabet is represented by a number in the range from 1 to 24. Thus, if it was desired to encode these data in a conventional way in binary language, each letter would have to be encoded in 5 bits (5 bits allow $2^4$=32 possible values to be encoded, but 4 bits would not be enough, because $2^3$=16 possibilities only). Furthermore, since the number of weeks ranges from 1 to 53, this number of weeks would be encoded in 6 bits ($2^5$=64), while the production number, ranging from 1 to 99999, would be encoded in 17 bits.

Overall, therefore, if the data were to be written in binary in the conventional way, a range of 43 bits (5*4+6+17=43) would be needed to enable the serial number and DOT number of the tyre to be deduced subsequently. Since the standardized zone 22 comprises only 38 bits, this is impossible. It is therefore proposed that the data should be encoded in a different way.

In the first place, rather than denoting the week number by a digit in the range from 1 to 53, the inventors have found that, for a given month in a given year, there is a maximum of six possible weeks. Thus, as the set of three letters in the serial number indicates the month of manufacture, the week number can be identified solely by a digit from 1 to 6, indicating the number of the week in this month, rather than the number of the week in the year.

Additionally, since it is impossible to encode all the above data according to a binary decomposition, it is proposed here that a base B should be created, enabling the data to be encoded in such a way as to limit the loss of space in the coding, as detailed below. In fact, it has been found that, when a letter is encoded in 5 bits and only 24 values are used, the possible values which are unused cause a loss of storage space (since there are 32 possible values in 5 bits, but only 24 are used).

Figure 3:
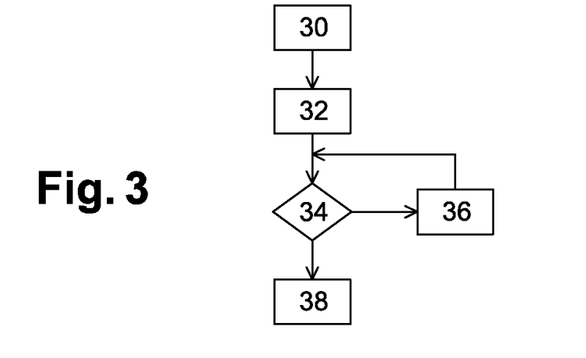
FIG. 3 is a diagram illustrating a method for reading data stored in the device of FIG. 1.

The method of reading the data encoded and stored in this way in the restricted range I6 will now be described with reference to FIG. 3.

The method starts with a step 30 of reading the data located in the 38 bits of the restricted range I6. In the case of Example 1, we therefore read the binary number N=10100101111111110001111010011000100111.

Step 30 is followed by a step 32 of decomposition of this binary number on the base B. Thus, in order to decode the data stored in the range I6, instead of using the ordinary base 2 of binary coding, namely the following base: ($2^0$; $2^1$; $2^2$; $2^3$; . . . ; $2^{38}$), we propose that the decoding should also use a base defined by a free generating family of vectors ($X_0$; $X_1$; $X_2$; $X_3$; $X_4$; $X_5$), specifically chosen on the basis of the type of alphanumeric values forming the data required for the determination of the serial number and the week number. Thus, in the format of required data described above, the required values for the determination of the serial number and the DOT number are: a digit from 1 to 6 (the week number in the month), four quantities from one to 24 (four letters), and five digits. The vectors $X_0$=1; $X_1$=6; $X_2$=6*24; $X_3$=6*$24^2$; $X_4$=6*$24^3$; $X_5$=6*$24^4$ are chosen, so that the arithmetic base proposed for use is the following base B: B=($6^0$; $6^1$; 6*$24^1$; 6*$24^2$; 6*$24^3$; 6*$24^4$). Using a base defined in this way, the data stored in binary in the range I6 can be decomposed so that the binary quantity N, when decomposed on this base, yields the decomposition coefficients ($c_0$; $c_1$; $c_2$; $c_3$; $c_4$; $c_5$) that can be used to determine, respectively, a digit $c_0$ from 1 to 6, four letters deduced from the coefficients $c_1$; $c_2$; $c_3$; $c_4$, and a quantity $c_5$ from 1 to 99999, such that a week number, a tyre retreading code letter, a year, a factory and a month of manufacture, and finally a production number of the tyre can be provided subsequently. Clearly, the base B used is defined by vectors which are not a family of polynomials, or in other words are not a sequence of powers of a single number, and the base is thus different from an ordinary base, such as the base 2 of the binary system, in which the vectors are a sequence of powers of the digit 2, namely ($2^0$; $2^1$; $2^2$; $2^3$; . . . ; $2^n$), or the base eight of the octal system in which the vectors are a sequence of powers of the digit eight ($8^0$; $8^1$; $8^2$; $8^3$; . . . ; $8^n$), or the like. In fact, the vectors of the base B are, firstly, the vector 1 (or 6), and then five successive powers of the number 24, multiplied on each occasion by the digit 6 (6*$24^0$; 6*$24^1$; 6*$24^2$; 6*$24^3$; 6*$24^4$). This base B has a dimension equal to 6, corresponding to the six data elements to be encoded, namely four letters, a digit from 1 to 6 and a production number from 1 to 9999.

In the case of Example 1, the data stored in the range I6 are as follows: 101001011111111100011-11010011000100111. This binary quantity corresponds to the decimal quantity 178237449767, which can be decomposed as follows on the base B: $N=178237449767=\Sigma c_i X_i = 5*6^0+19*6^1+3*6*24^1+0*6*24^2+1*6*24^3+89537*(6*24^4)$. In other words, the decomposition coefficients obtained on this base are as follows: $(c_0; c_1; c_2; c_3; c_4; c_5)=(5; 19; 3; 0; 1; 89537)$. This decomposition is unique, since the base B is a free base.

Thus the decomposition step 32 provides the coefficients $(c_0; c_1; c_2; c_3; c_4; c_5)$, which can subsequently be converted to values enabling the serial number and week number to be determined. However, step 32 is followed by a step 34 of testing the values of the coefficients $(c_0; c_1; c_2; c_3; c_4; c_5)$. This is because a correction has to be made if one of the coefficients $c_i$ is equal to 0, since the value 0 does not correspond to a letter or a quantity in the conversion tables indicating a letter, a week number or a production number. The test step 34 consists in checking whether one of the coefficients $c_i$ has a value of 0.

If the result of the test 34 is positive, that is to say if one of the coefficients is zero, the method moves to a correction step 36, in which this coefficient $c_i$ is modified by being assigned the value of 24, and the coefficient $c_{i+1}$ is also modified by having the value 1 subtracted from it. In the case of Example 1 above, the value 0 given to the fourth coefficient $c_3$ (vector $6*24^2$) cannot be accepted; therefore, this coefficient $c_3$ is considered to be equal to 24 and the coefficient $c_4$ of the next vector ($6*24^3$) must be reduced by 1, becoming 0.

At the end of the correction step 36, the method returns to step 34 to test for the presence of the value 0 among the coefficients $(c_0; c_1; c_2; c_3; c_4; c_5)$. In the case of Example 1, it is now the coefficient $c_4$ that is equal to 0. The same correction step 36 must therefore be executed: the value 24 is assigned to this new coefficient $c_4$ (of the vector $6*24^3$) and the coefficient $c_5$ of the next vector (vector $6*24^4$) is reduced by 1, thus becoming 89536. The method then returns to the test step 34.

If the result of the test 34 is negative, that is to say if none of the coefficients is zero, the method moves to a step 38 of determining the serial number and the week number in the following way.

After any correction steps 36, the decomposition coefficients are now as follows: $(c'_0; c'_1; c'_2; c'_3; c'_4; c'_5)=(5; 19; 3; 24; 24; 89536)$. These decomposition coefficients enable the following data to be identified:

the first coefficient $c_0$, which has become $c'_0$ at the end of steps 34, 36, indicates the number of the week of manufacture of the tyre; in the present case, this is the fifth week of the month determined subsequently, the second coefficient $c_1$, which has become $c'_1$, can be used to identify a letter corresponding to a code used for the retreading of the tyre, in this case the letter having the number 19 in a conversion table, namely the letter T, the third, fourth and fifth coefficients $c_2$; $c_3$; $c_4$, which have become $c'_2$; $c'_3$; $c'_4$, can be used to identify three letters indicating, in combination, a month, a factory and a year of manufacture of the tyre, in this case the letters having the numbers 3, 24, 24 in a conversion table, namely the letters C, Z, Z, the sixth coefficient $c_5$, which has become $c'_5$, can be used to identify a production number of the tyre, namely 89536 in Example 1.

Thus step 38 can be used to determine the serial number ZZC89536T, and the number of the week in the year, namely 09. This week number is obtained from the number 5, indicating that it is the fifth week in the month, and the set of three letters ZZC, indicating that the year of manufacture is 2011 and the month is February, the fifth week of February corresponding to week 09 of the year 2011. From this, it is possible to deduce the fourth group of the DOT number: 0911.

Figure 4:
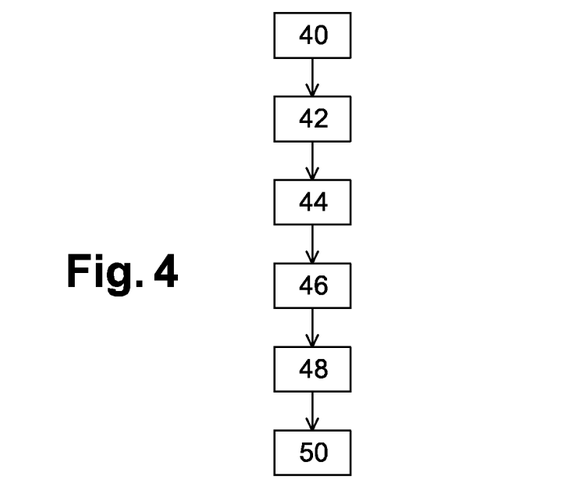
FIG. 4 is a diagram illustrating a method for writing data to the device of FIG. 1.

The method of writing data to the restricted range I6 will now be described with reference to FIG. 4 and Example 2.

During or after the manufacture of the tyre, a step 40 of determining the serial number and the week of manufacture is initially executed. According to Example 2, the serial number determined according to the factory, the month, the year, the production number and the retreading code is: OLY56000R. The week of manufacture is 14.

Step 40 is followed by a step 42 in which the serial number and the manufacturing week number of the tyre are converted to a sequence of alphanumeric values, namely (2; R; Y; L; O; 56000). In this conversion step, the alphanumeric values are ordered as follows: (simplified week number; retreading code; 3rd letter of the set of three letters; 2nd letter of the set of three letters; 1st letter of the set of three letters; production number). It should be noted that the week number, initially 14, is converted to a digit from 1 to 6, called the "simplified week number", by determining which week of the month of April corresponds to the 14th week of the year 2010. This is the second week of April, and therefore the digit 2 is chosen.

Step 42 is followed by a first step 44 in which each value of the sequence (2; R; Y; L; O; 56000) is encoded so as to obtain a sequence of coefficients in the form of integers $(c_0; c_1; c_2; c_3; c_4; c_5)=(2; 17; 23; 12; 15; 56000)$. During this step 42, each of the letters of the preceding sequence has been transformed to a digit in the range from 1 to 24 on the basis of the conversion table. The coefficients $(c_0; c_1; c_2; c_3; c_4; c_5)$ determined in this way form the decomposition coefficients of the future binary quantity on the base B described above.

At the end of the encoding 44, the method moves to a step 46 in which a quantity N is calculated by multiplying each coefficient $(c_0; c_1; c_2; c_3; c_4; c_5)=(2; 17; 23; 12; 15; 56000)$ by a corresponding vector $(6; 6^1; 6*24^1; 6*24^2; 6*24^3; 6*24^4)$ of the family defining base B. This gives us:

$$N=2*(1)+17*(6)+23*(6*24)+12*(6*24*24)+15*(6*24*24*24)+56000*(6*24*24*24*24)$$

Therefore, N=111478025048.

Step 46 is followed by a second step 48 of encoding the calculated quantity N in bits, providing the following binary quantity:

N=1100111110100100110111010101101011000.

When this quantity N in bits has been obtained, it is written, in a step 50, to the restricted range I6.

Thus, at the end of this writing step, we have data stored in the restricted range I6 in such a way that the serial number and week number of the tyre can be determined by applying the reading method described above.

It should be noted that some or all of the methods described above may be applied by means of coded instructions for causing the steps of the method to be executed when the method is run on a computer. The instructions may be obtained from computer programs recorded on a data recording medium, for example a medium of the hard disk, flash memory, CD or DVD type. Provision may be made to make a program of this type available for downloading on a telecommunications network, preferably a wireless network such as the Internet or an intranet network. Updates of the program can thus be sent via this network to the computers connected to the network.

The electronic member may be passive, that is to say adapted to communicate data contained in the electronic chip to the reading unit, or active, that is to say adapted to receive data sent by a sensor in order to communicate them to the reading unit. An active member of this type may comprise, notably, a microprocessor as well as a memory. Other conversion tables between digits and letters may be used.

Among the advantages of the invention, it will be evident that a maximum of data relating to the identification of the tyre can be stored in the range I6, although this range is very limited in size.

The invention is not limited to the embodiments described above. In particular, the reading and writing methods described above may be applied to storage zones other than the restricted range I6, having more than 38 bits or less than 38 bits. They may also be applied to the storage of data other than the serial number and the manufacturing week number of the tyre.

The invention claimed is:

1. A method for reading data stored in an electronic device integrated into a tyre identified by a serial number and a manufacturing week number, the device including a storage unit with a data storage zone having at least a restricted storage range formed of bits, in which a number of the bits totals to less than or equal to 38, the method comprising steps of:
   reading the data stored in the restricted storage range; and
   decoding the data read from the restricted storage range in order to determine the serial number and the manufacturing week number of the tyre,
   wherein, in the decoding step, the data read from the restricted storage range is decoded by decomposition of a binary quantity (N) stored in the bits of the restricted storage range on a base (B) defined by a free generating family of vectors $(X_0; X_1; \ldots ; X_n)$,
   wherein one or more decomposition coefficients $(c_i)$ in the base correspond to a value useable to identify one or more members of a group that includes: a production number; a factory, a week, a month, a year of manufacture of the tyre; and a code used for retreading the tyre,
   wherein the base (B) is a free arithmetic base, and
   wherein a dimension of the free arithmetic base is 6, such that decomposition of the binary quantity (N) stored in the restricted storage range provides six coefficients $(c_0; c_1; c_2; c_3; c_4; c_5)$, of which:
   a first coefficient $(c_0)$ of the decomposition is useable to identify the manufacturing week number of the tyre,
   a second coefficient $(c_1)$ of the decomposition is useable to identify a letter corresponding to the code used for retreading the tyre,
   third, fourth, and fifth coefficients $(c_2; c_3; c_4)$ of the decomposition are useable to identify three letters that, in combination, indicate the month, the factory, and the year of manufacture of the tyre, and
   a sixth coefficient $(c_5)$ of the decomposition is useable to identify the production number of the tyre.

2. The method according to claim 1,
   wherein the decoding of the data read from the restricted storage range provides values useable to identify any combination of: a production number; a factory, a month, and year of manufacture of the tyre; and a code used for retreading the tyre, and
   wherein the values are useable to determine the serial number and part of a DOT number of the tyre.

3. The method according to claim 2, wherein:
   the production number is identified by five digits, and/or
   the factory, the month, and the year of manufacture are identified by a combination of three letters, and/or
   the manufacturing week number is identified by one digit, and/or
   the code used for retreading the tyre is identified by one letter.

4. The method according to claim 1, wherein the manufacturing week number is identified by an integer digit in a range of from 1 to 6.

5. The method according to claim 1, wherein the serial number and the manufacturing week number of the tyre are determined from ten values formed of four letters and six digits, each of the ten values being obtained in the decoding of the data read from the restricted storage range.

6. The method according to claim 1,
   wherein, in the decoding step, the data read from the restricted storage range is decoded by decomposition of a binary quantity (N) stored in the bits of the restricted storage range on a base (B) defined by a free generating family of vectors, and
   wherein the free generating family of vectors is distinct from a family of polynomials of a type $(A^0; A^1; A^2; \ldots ; A^n)$, where n is a positive integer and A is a constant real quantity.

7. The method according to claim 1, wherein the free generating family of vectors defining the base is: $(1; 6^1; 6*24^1; 6*24^2; 6*24^3; 6*24^4)$.

8. The method according to claim 1, wherein the data storage zone includes, in addition to the restricted storage range, at least one range of bits reserved for at least one element chosen from: a protocol header, a filter value, a partition value, an identifier of a manufacturer of the tyre, and an item reference.

9. The method according to claim 1,
   wherein the data storage zone is standardized, such that a quantity of bits stored in the data storage zone is limited by a standard, and
   wherein the storage unit further includes a data storage free zone.

10. A method for writing data to an electronic device integrated in a tyre, the data being useable to identify a serial number and a manufacturing week number of the tyre, the method comprising steps of:
    converting the serial number and the manufacturing week number of the tyre to a sequence of alphanumeric values;
    encoding each value of the alphanumeric values to obtain a sequence of integer coefficients $(c_0; c_1; c_2; c_3; c_4; c_5)$;
    calculating a quantity (N) by multiplying each coefficient $(c_0; c_1; c_2; c_3; c_4; c_5)$ by a corresponding vector $(X_0; X_1; X_2; X_3; X_4; X_5)$ of a predetermined free arithmetic base (B);
    encoding the quantity in bits; and
    writing the bits of the quantity as data in a restricted storage range of a storage unit of the electronic device,
    wherein the data is subsequently readable and decodable to determine the serial number and manufacturing week number of the tyre.

11. A non-transitory computer-readable storage medium storing code instructions that, when executed by a computer causes the computer to perform a method for reading data stored in an electronic device integrated into a tyre identified by a serial number and a manufacturing week number, the device including a storage unit with a data storage zone having at least a restricted storage range formed of bits, in which a number of the bits totals to less than or equal to 38, the method including steps of:

reading the data stored in the restricted storage range; and decoding the data read from the restricted storage range in order to determine the serial number and the manufacturing week number of the tyre, wherein, in the decoding step, the data read from the restricted storage range is decoded by decomposition of a binary quantity (N) stored in the bits of the restricted storage range on a base (B) defined by a free generating family of vectors ($X_0; X_1; \ldots ; X_n$), wherein one or more decomposition coefficients ($c_i$) in the base correspond to a value useable to identify one or more members of a group that includes: a production number; a factory, a week, a month, a year of manufacture of the tyre; and a code used for retreading the tyre, wherein the base (B) is a free arithmetic base, and wherein a dimension of the free arithmetic base is 6, such that decomposition of the binary quantity (N) stored in the restricted storage range provides six coefficients ($c_0; c_1; c_2; c_3; c_4; c_5$), of which:

a first coefficient ($c_0$) of the decomposition is useable to identify the manufacturing week number of the tyre, a second coefficient ($c_1$) of the decomposition is useable to identify a letter corresponding to the code used for retreading the tyre, third, fourth, and fifth coefficients ($c_2; c_3; c_4$) of the decomposition are useable to identify three letters that, in combination, indicate the month, the factory, and the year of manufacture of the tyre, and a sixth coefficient ($c_5$) of the decomposition is useable to identify the production number of the tyre.

12. A non-transitory computer-readable storage medium storing code instructions that, when executed by a computer causes the computer to perform a method for writing data to an electronic device integrated in a tyre, the data being useable to identify a serial number and a manufacturing week number of the tyre, the method including steps of:

converting the serial number and the manufacturing week number of the tyre to a sequence of alphanumeric values;

encoding each value of the alphanumeric values to obtain a sequence of integer coefficients ($c_0; c_1; c_2; c_3; c_4; c_5$);

calculating a quantity (N) by multiplying each coefficient ($c_0; c_1; c_2; c_3; c_4; c_5$) by a corresponding vector ($X_0; X_1; X_2; X_3; X_4; X_5$) of a predetermined free arithmetic base (B);

encoding the quantity in bits; and writing the bits of the quantity as data in a restricted storage range of a storage unit of the electronic device, wherein the data is subsequently readable and decodable to determine the serial number and the manufacturing week number of the tyre.

13. An apparatus for reading data stored in an electronic device integrated into a tyre, the apparatus comprising:

a sensor for reading the data stored in a storage unit of the electronic device integrated into the tyre, the storage unit including a data storage zone having at least a restricted storage range formed of bits, in which a number of the bits totals to less than or equal to 38, wherein the data read by the sensor is stored as bits; and a decoder for decoding the bits to provide a serial number and a manufacturing week number of the tyre, wherein, in the decoder, the data read from the restricted storage range is decoded by decomposition of a binary quantity (N) stored in the bits of the restricted storage range on a base (B) defined by a free generating family of vectors ($X_0; X_1; \ldots ; X_n$), wherein one or more decomposition coefficients ($c_i$) in the base correspond to a value useable to identify one or more members of a group that includes: a production number; a factory, a week, a month, a year of manufacture of the tyre; and a code used for retreading the tyre, wherein the base (B) is a free arithmetic base, and wherein a dimension of the free arithmetic base is 6, such that decomposition of the binary quantity (N) stored in the restricted storage range provides six coefficients ($c_0; c_1; c_2; c_3; c_4; c_5$), of which:

a first coefficient ($c_0$) of the decomposition is useable to identify the manufacturing week number of the tyre, a second coefficient ($c_1$) of the decomposition is useable to identify a letter corresponding to the code used for retreading the tyre, third, fourth, and fifth coefficients ($c_2; c_3; c_4$) of the decomposition are useable to identify three letters that, in combination, indicate the month, the factory, and the year of manufacture of the tyre, and a sixth coefficient ($c_5$) of the decomposition is useable to identify the production number of the tyre.

* * * * *

UNITED STATES PATENT AND TRADEMARK OFFICE
CERTIFICATE OF CORRECTION

PATENT NO. : 9,489,551 B2
APPLICATION NO. : 14/402259
DATED : November 8, 2016
INVENTOR(S) : Thierry Penot Page 1 of 1

It is certified that error appears in the above-identified patent and that said Letters Patent is hereby corrected as shown below:

Column 13
Line 41, "causes" should read --cause--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*